US010846542B2

(12) United States Patent
Kario et al.

(10) Patent No.: US 10,846,542 B2
(45) Date of Patent: Nov. 24, 2020

(54) SYSTEMS AND METHODS FOR AUGMENTATING UPRIGHT OBJECT DETECTION

(71) Applicant: Mobileye Vision Technologies Ltd., Jerusalem (IL)

(72) Inventors: Jack Kario, Jerusalem (IL); Tomer Baba, Jerusalem (IL); Erez Dagan, Tel-Aviv (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 244 days.

(21) Appl. No.: 16/068,574

(22) PCT Filed: Jan. 11, 2017

(86) PCT No.: PCT/IB2017/000035
§ 371 (c)(1),
(2) Date: Jul. 6, 2018

(87) PCT Pub. No.: WO2017/122086
PCT Pub. Date: Jul. 20, 2017

(65) Prior Publication Data
US 2019/0026568 A1    Jan. 24, 2019

Related U.S. Application Data

(60) Provisional application No. 62/277,068, filed on Jan. 11, 2016.

(51) Int. Cl.
*H04N 7/18* (2006.01)
*G06K 9/00* (2006.01)
(Continued)

(52) U.S. Cl.
CPC ....... *G06K 9/00798* (2013.01); *G05D 1/0246* (2013.01); *G06K 9/00805* (2013.01);
(Continued)

(58) Field of Classification Search
USPC ....... 382/100, 103, 104, 106–108, 154, 162, 382/168, 173, 181, 190, 199, 203, 209, (Continued)

(56) References Cited

U.S. PATENT DOCUMENTS

| 2015/0086080 A1* | 3/2015 | Stein | H04N 7/183 382/104 |
|---|---|---|---|
| 2015/0317525 A1* | 11/2015 | Stein | H04N 7/18 382/104 |

(Continued)

OTHER PUBLICATIONS

International Search Report and Written Opinion for International Application No. PCT/IB2017/000035, dated Apr. 6, 2017 (12 pages).
(Continued)

*Primary Examiner* — Seyed H Azarian
(74) *Attorney, Agent, or Firm* — Finnegan, Henderson, Farabow, Garrett & Dunner, LLP

(57) ABSTRACT

Systems and methods are provided for augmenting upright object detection. In one implementation, a system for augmenting detection of objects in an environment of a vehicle may include at least one processing device. The at least one processing device may be programmed to: receive, from an image capture device, a first image frame, the first image frame including an attention area associated with a suspected upright object indication; warp, using a level road plane model, an area in a second earlier image frame that corresponds to the attention area; track a plurality of image patches across the warped area and the attention area; compute a road plane model fit to the tracked image patches; and determine whether to suppress the upright object indication based on the tracked image patches being more consistent with a road plane model than with an upright object model.

25 Claims, 14 Drawing Sheets

(51) Int. Cl.
  *G06T 7/73* (2017.01)
  *G05D 1/02* (2020.01)
(52) U.S. Cl.
  CPC ....... *G06T 7/75* (2017.01); *G05D 2201/0213* (2013.01); *G06T 2207/30261* (2013.01)
(58) Field of Classification Search
  USPC ........ 382/219, 232, 254, 274–276, 286–291, 382/305, 312; 348/148
  See application file for complete search history.

(56) References Cited

U.S. PATENT DOCUMENTS

2015/0332114 A1* 11/2015 Springer ............... B60W 50/14
  348/148
2015/0371096 A1* 12/2015 Stein .................. G06K 9/00798
  382/103

OTHER PUBLICATIONS

Okada, Ryuzo, "Obstacle Detection Based on Motion Constraint of Virtual Planes," Proceedings of the 2002 IEEE, International Conference on Intelligent Robots and Systems. Sep. 30-Oct. 4, 2002 (6 pages).

Wedel, Andreas et al., "Monocular Video Serves RADAR-based Emergency Braking," Intelligent Vehicles Symposium, IEEE. Jun. 1, 2007 (6 pages).

Pinggera, Peter et al., "High-Petformance Long Range Obstacle Detection Using Stereo Vision," International Conference on Intelligent Robots and Systems, Sep. 28, 2015 (6 pages).

Romdhane, Nadra Ben et al., "A Generic Obstacle Detection Method for Collision Avoidance," Intelligent Vehicles Symposium (IV), IEEE, Jun. 5, 2011 (6 pages).

Bertozzi M. et al., "An Extension to the Inverse Perspective Mapping to Handle Non-Flat Roads," Proceedings of the IEEE International Conference on Intelligent Vehicles, Oct. 28, 1998 (6 pages).

* cited by examiner

SYSTEMS AND METHODS FOR AUGMENTATING UPRIGHT OBJECT DETECTION

CROSS REFERENCE TO RELATED APPLICATION

This application is a national phase of International Application No. PCT/IB2017/000035, filed Jan. 11, 2017, which claims the benefit of priority of United States Provisional Patent Application No. 62/277,068, filed on Jan. 11, 2016, All of the foregoing applications are incorporated herein by reference in entirety.

BACKGROUND

Technical Field

The present disclosure relates generally to advanced driver assistance systems (ADAS), and autonomous vehicle (AV) systems. Additionally, this disclosure relates to systems and methods for processing sensor data, and systems and methods for augmenting upright object detection in a path of a vehicle.

BACKGROUND INFORMATION

Advanced driver assistance systems (ADAS), and autonomous vehicle (AV) systems use cameras and other sensors, together with object classifiers, to detect specific objects in an environment of a vehicle navigating a road. Object classifiers are designed to detect predefined objects and are used within ADAS and AV systems to control the vehicle or alert a driver based on the type of object that is detected at its location, etc. The ability of preconfigured classifiers, as a single solution, to deal with the infinitesimal variety and detail of road environments and its surroundings and its often dynamic nature (moving vehicles, shadows, etc.) is, however, limited and is sensitive to errors. One error which is sometimes encountered by current ADAS and AV systems is a false positive detection of a steep graded road (or a section of road) as an upright object. As ADAS and AV systems progress towards fully autonomous operation, it would be beneficial to augment the abilities of such systems.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The navigational response may also take into account other data including, for example, global positioning system (GPS) data, sensor data (e.g., from an accelerometer, a speed sensor, a suspension sensor, etc.), and/or other map data.

Disclosed embodiments provide systems and methods that may be used as part of or in combination with autonomous navigation/driving and/or driver assist technology features. Driver assist technology refers to any suitable technology to assist drivers in the navigation and/or control of their vehicles, such as forward collision warning (FCW), lane departure warning (LDW) and/or traffic sign recognition (TSR) systems, as opposed to fully autonomous driving systems. In various embodiments, the system may include one, two, or more cameras mountable in a vehicle and an associated processor that may monitor the environment of the vehicle. In further embodiments, additional types of sensors may be mounted in the vehicle and may be used in the autonomous navigation and/or driver assist system. In some examples of the presently disclosed embodiments, the system may provide techniques for processing images of an environment ahead of a vehicle, navigating a road, and/or training a neural networks or deep learning algorithms to estimate a future path of a vehicle based on images. In yet further examples of the presently disclosed subject matter, the system may provide techniques for processing images of an environment ahead of a vehicle and/or navigating a road using a trained neural network to estimate a future path of the vehicle.

One error which is sometimes encountered by current ADAS and AV systems is a false positive detection of a high grade road segment as an upright object. The grade of a road segment, as seen by an image capture unit, can be effected by the pitch angle of the vehicle (or of an imaging unit onboard the vehicle) relative to the grade of the road ahead of the vehicle.

Consistent with a disclosed embodiment, a system for augmenting detection of objects in an environment of a vehicle is provided. The system may include at least one processing device programmed to: receive, from an image capture device, a first image frame, the first image frame including an attention area associated with a suspected upright object indication; warp, using a level road plane model, an area in a second earlier image frame that corresponds to the attention area; track a plurality of image patches across the warped area and the attention area; compute a road plane model fit to the tracked image patches; and determine whether to suppress the upright object indication based on the tracked image patches being more consistent with a road plane model than with an upright object model.

Consistent with another disclosed embodiment, a method for augmenting detection of objects in an environment of a vehicle is provided. The method may include receiving, from an image capture device, a first image frame, the first image frame including an attention area associated with a suspected upright object indication; warping, using a level road plane model, an area in a second earlier image frame that corresponds to the attention area; tracking a plurality of image patches across the warped area and the attention area; computing a road plane model fit to the tracked image patches; and determining whether to suppress the upright object indication based on the tracked image patches being more consistent with a road plane model than with an upright object model.

Consistent with yet another disclosed embodiment, a non-transitory computer-readable medium is provided storing program instructions for carrying out a method. The method may include receiving, from an image capture device, a first image frame, the first image frame including an attention area associated with a suspected upright object indication; warping, using a level road plane model, an area in a second earlier image frame that corresponds to the attention area; tracking a plurality of image patches across the warped area and the attention area; computing a road plane model fit to the tracked image patches; and determining whether to suppress the upright object indication based on the tracked image patches being more consistent with a road plane model than with an upright object model.

Consistent with other disclosed embodiments, non-transitory computer readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
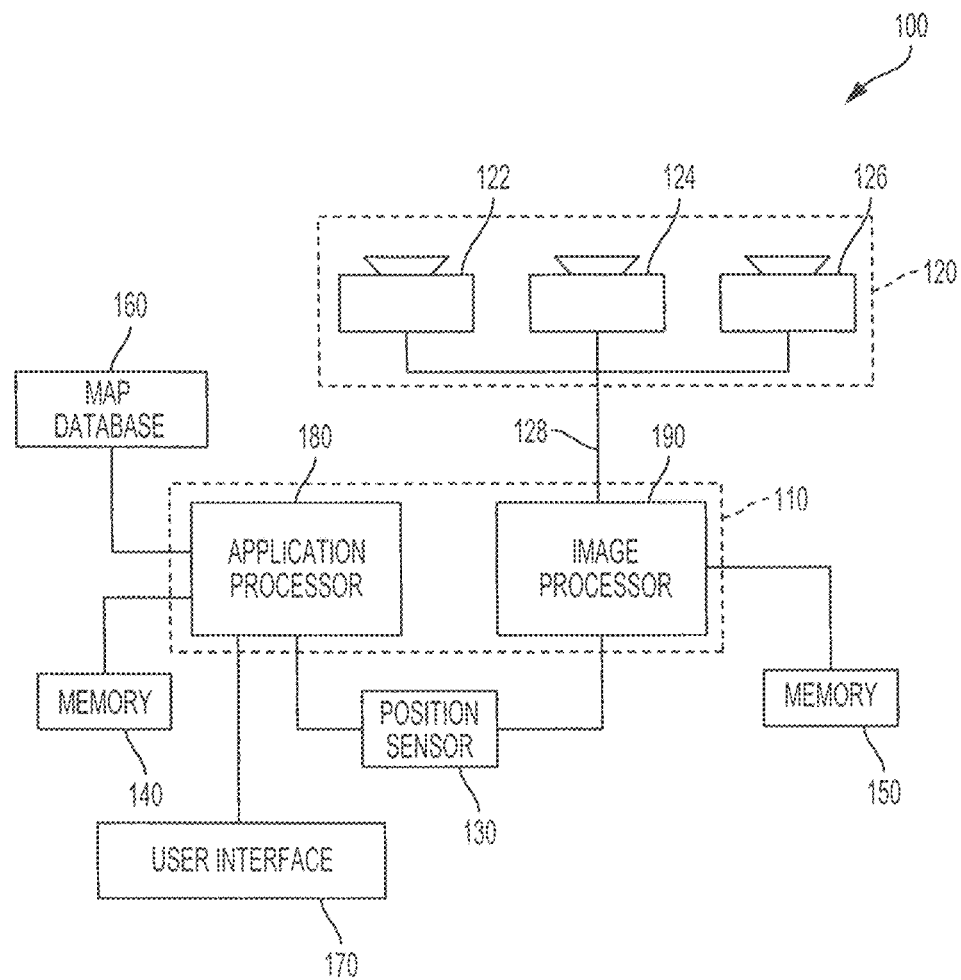
FIG. 1 is a block diagram representation of a system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Before discussing in detail examples of features of the discloses embodiments associated with processing images of an environment ahead of a vehicle and for augmenting upright object detection in a path of a vehicle, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

One error which is sometimes encountered by current ADAS and AV systems is a false positive detection of an upright object, when the object that was observed by an imaging unit is actually of a relatively high grade segment of a road. The image flow footprint of such high grade roads may resemble an upright object (e.g., for an incline). The grade of a road segment, as seen by an image capture device, may be affected by the pitch angle of the host vehicle relative to the road ahead of the vehicle. In this regard, when referring to a grade of a road herein, the focus may be on the Δgrade, or the change in grade from the current position of the vehicle (with the imaging unit onboard) and an area in the field of view of the imaging unit (e.g., especially if it is on the predicted path of the vehicle). This may be the case, for example, when the road ahead rises up at a sharp incline, or when the host vehicle is descending down a decent and the road ahead is climbing upwards (even more moderately). In general, in the context of the disclosed embodiments, the grade of the road (or Δgrade) may be considered high when it is at or near a level where detection errors would occur at least in part as a consequence of the high grade of the road. In other words, a high grade road may be seen as such that, all other things being equal, it causes an increase in the rate of errors in an ADAS/AV system. That is, these errors may occur when a road detection algorithm or algorithms of the ADAS/AV system cannot consistently, robustly, persistently or accurately detect an actual-high grade road as being a "road" and/or when it is at or near a level where a road detection algorithm or algorithms of the ADAS/AV system erroneously detects the high grade road as some other object, typically an upright object, or a specific kind of upright object. It would be appreciated that due to noise, conditions related to the sensing hardware, ambient conditions, etc., the error rate may shift and change, and margins and/or tolerances can be introduced into or otherwise included in the detection/classification algorithm or in the system that implements it.

In one example, the increase in error rate may be associated with detection of upright objects, or with an increase in error rate of detection of a specific type of upright object. For example, an increase in error rate by any one of: 10%, 20%, 50%, 75% etc., may be used as benchmark for a "high" grade road.

Embodiments of the present disclosure are not limited to scenarios where a suspected upright object indication is caused by a high grade road. The suspected upright object indication may be associated with various other circumstances, and may result from other types of image data and also from data that is not image based or is not exclusively image based, as well. For example, certain objects on the road may be detected by a radar sensor as an upright object, and may trigger a suspected upright object indication, where in fact, those objects are not upright objects. An example of an object, which under certain circumstances may have an RF reflectance profile that may be "seen" by a radar processing algorithm as an upright object may be a metal strip on the road, specifically under certain overhead bridges.

In some embodiments, the detection of an upright object may be based, exclusively or partly, on image flow analysis of two or more image frames (or portions of the frames), typically but not necessarily, a current image frame and one or more image frames captured earlier than the current image frame.

In some disclosed embodiments, the determination of an upright object may not necessarily be made on the basis or solely on the basis of image data. For example, other types of data can be used, including data obtained from a radar sensor, data obtained from a lidar sensor and/or data obtained from an acoustic sensor.

Furthermore, in some embodiments, the upright object detection may be generated by a specific algorithm that is configured to detect general upright objects, or by an algorithm that is used to detect a specific type of upright object, such as a lamppost, a barrier, vehicles, pedestrian, general object or obstacle, etc.

FIG. 1 is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition devices and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition device 120. For example, data interface 128 can include any wired and/or wireless link or links for transmitting image data acquired by image acquisition device 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMPs® and the DMA, the second MIPS34K CPU and the multi-channel DMA as well as the other peripherals. The five VCEs, three VMPs® and the MIPS34K CPU can perform intensive vision computations required by multi-function bundle applications. In another example, the EyeQ3®, which is a third generation processor and is six times more powerful that the EyeQ2®, may be used in the disclosed examples. In yet another example, the EyeQ4®, the fourth generation processor, may be used in the disclosed examples. In other examples, the EyeQ4® and/or the the EyeQ5® may be used in the disclosed embodiments. Of course, any newer or future EyeQ processing devices may also be used together with the disclosed embodiments.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing and processing the imagery from the image sensors. The CPU can include any number of microcontrollers or microprocessors. The support circuits can be any number of circuits generally well known in the art, including cache, power supply, clock and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensor, a RF sensor (e.g., radar transceiver), a LIDAR sensor. Such sensors can be used independently of or in cooperation with the image acquisition device 120. For example, the data from the radar system (not shown) can be used for validating the processed information that is received from processing images acquired by the image acquisition device 120, e.g., to filter certain false positives resulting from processing images acquired by the image acquisition device 120, or it can be combined with or otherwise compliment the image data from the image acquisition device 120, or some processed variation or derivative of the image data from the image acquisition device 120.

Figure 2A:
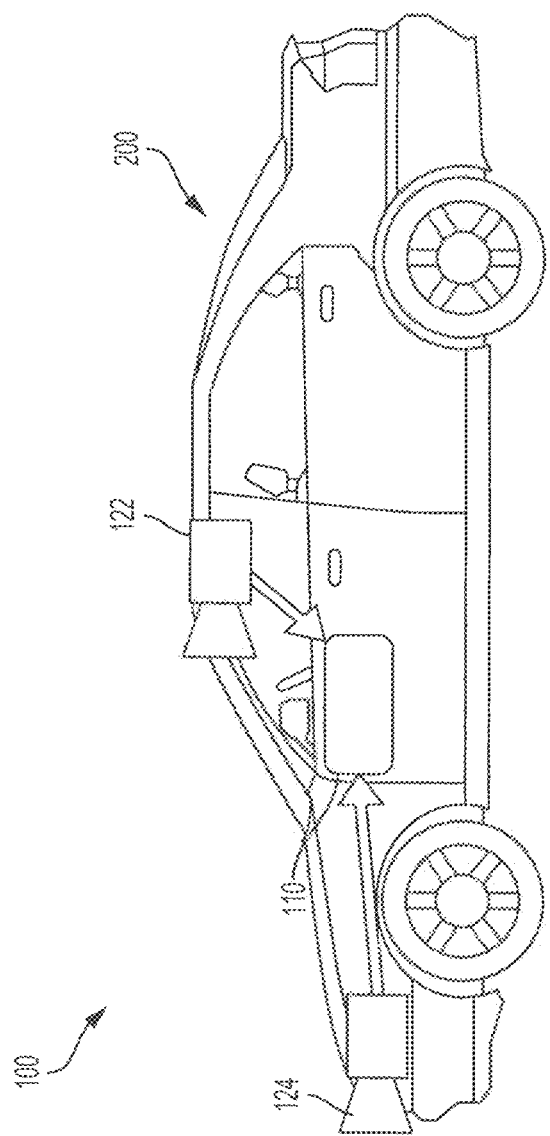
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single-image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
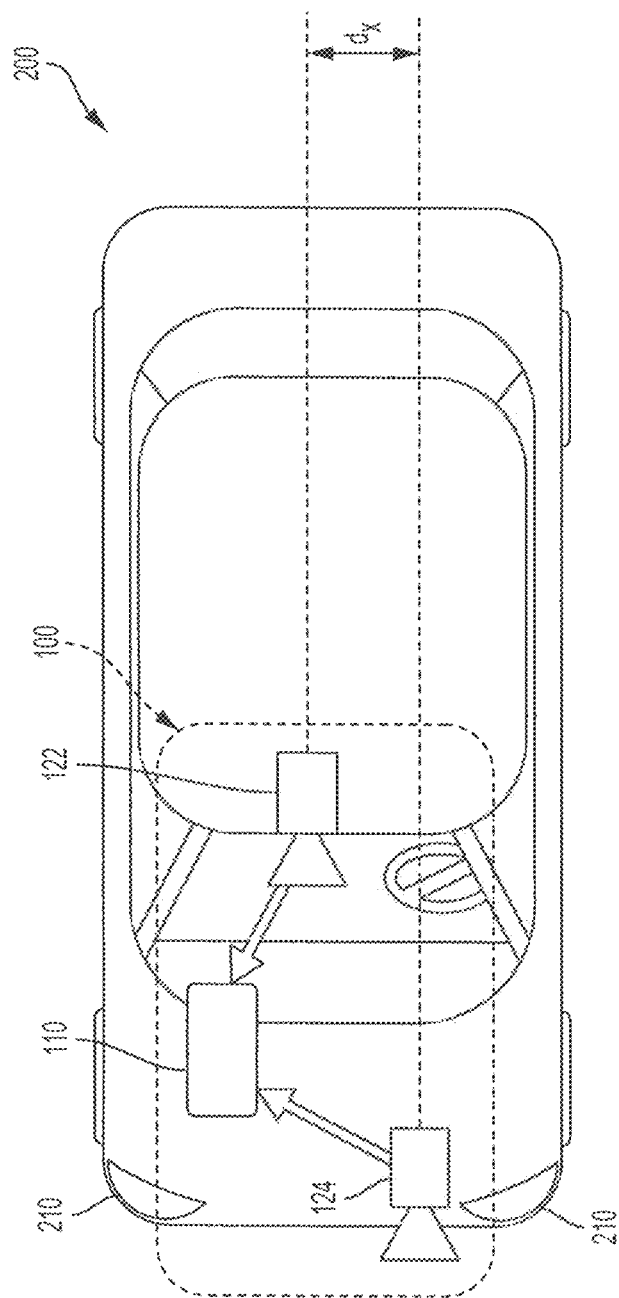
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
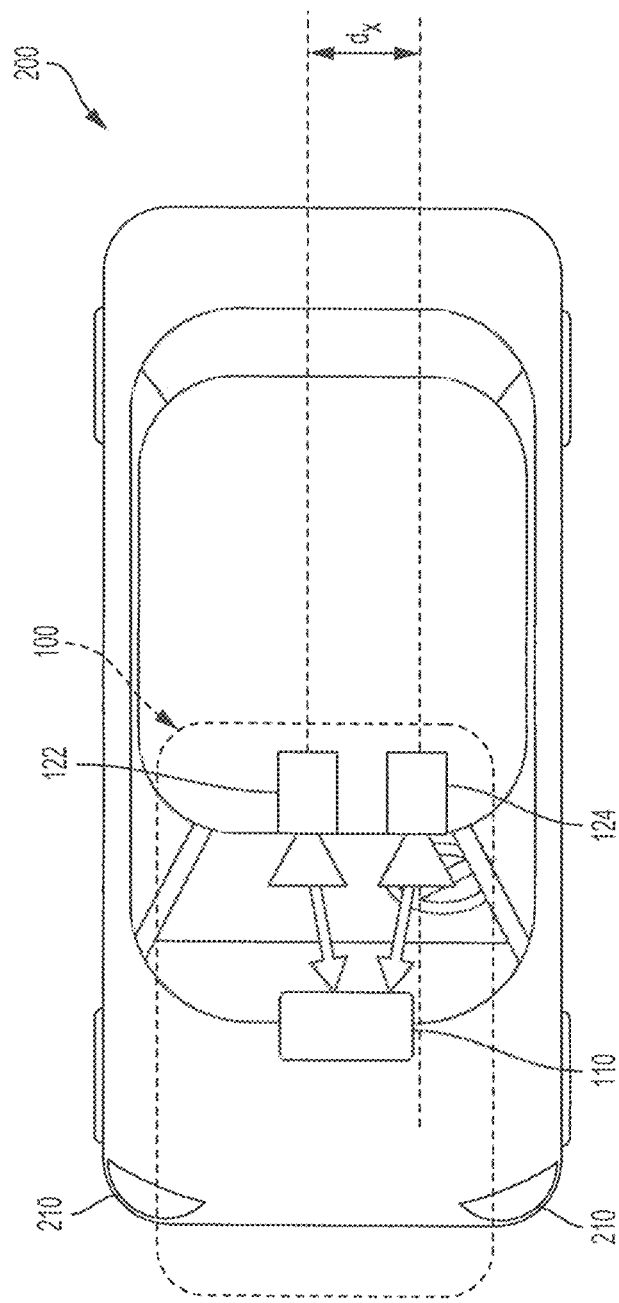
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
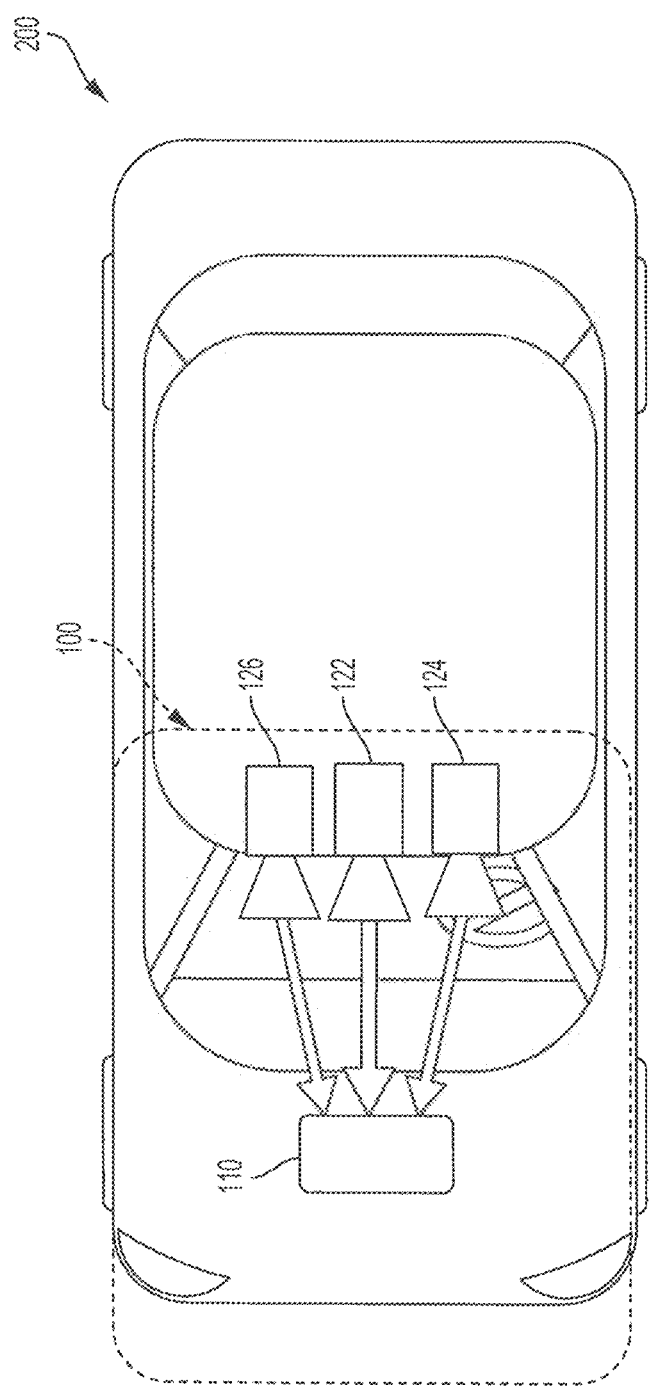
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
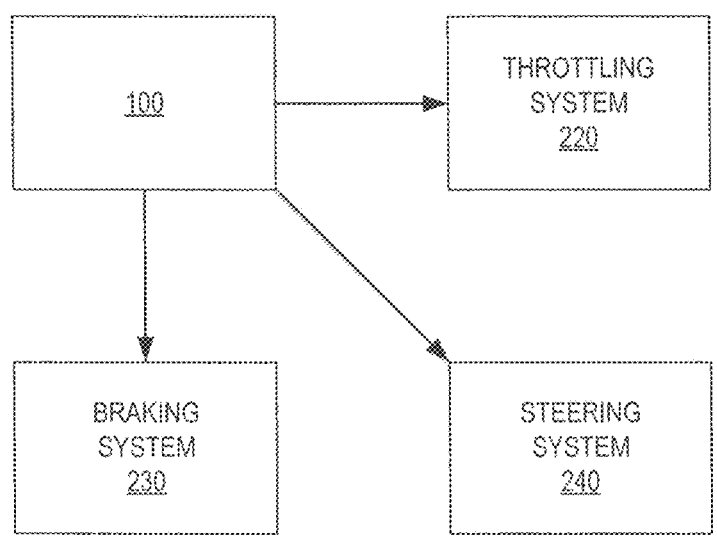
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3:
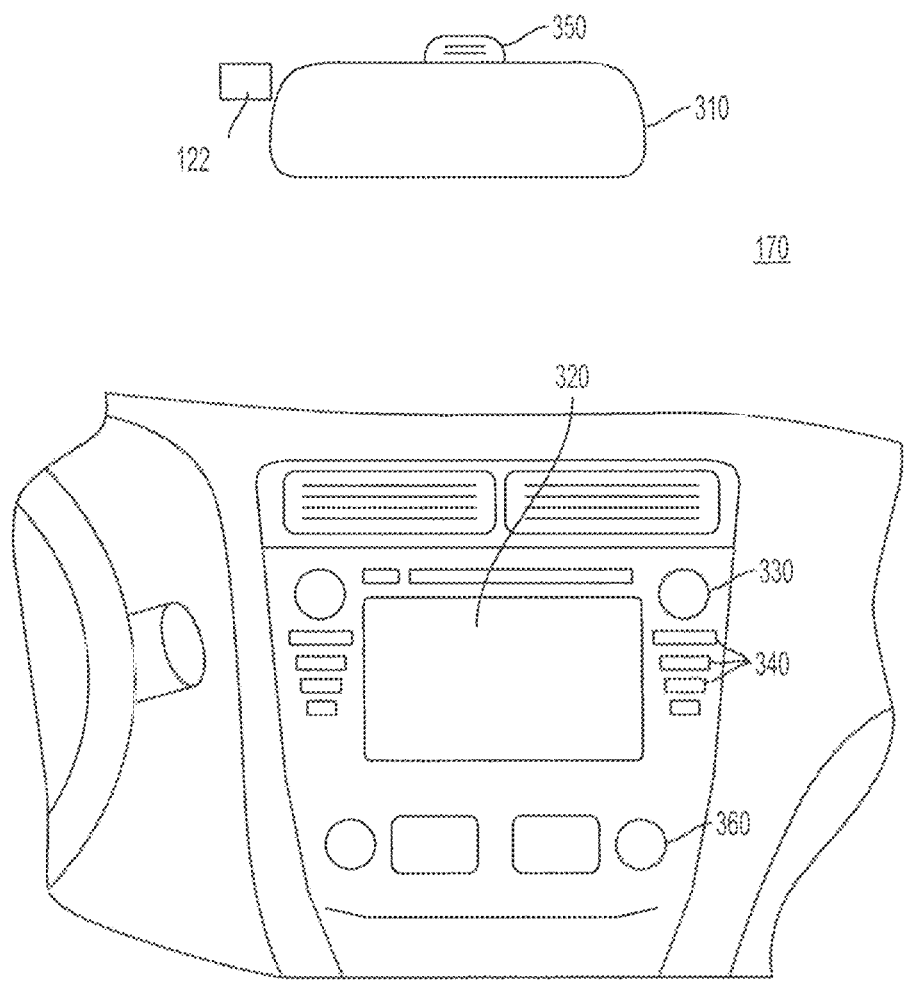
FIG. 3 is a diagrammatic representation of an interior of a vehicle including a rearview mirror and a user interface for a vehicle imaging system consistent with the disclosed embodiments.

As shown in FIG. 3, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

As discussed above, system 100 may provide drive assist functionality or semi or fully autonomous driving functionality that uses a single or a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, one or more of image capture devices 122-126 may be mounted behind glare shield that is flush with the windshield of vehicle 200. Such shielding may act to minimize the impact of any reflections from inside the car on image capture devices 122-126.

In another embodiment, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform processing of the narrow FOV camera or even a cropped FOV of the camera. In some embodiments, the first processing device can be configured to use a trained system (e.g., a trained neural network) to detect objects and/or road features (commonly referred to as "road objects"), predict a vehicle's path, etc. ahead of a current location of a vehicle.

The first processing device can be further adapted to preform image processing tasks, for example, which can be intended to detect other vehicles, pedestrians, lane marks, traffic signs, traffic lights, and other road objects. Still further, the first processing device may calculate a disparity of pixels between the images from the main camera and the narrow camera and create a 3D reconstruction of the environment of vehicle 200. The first processing device may then combine the 3D reconstruction with 3D map data (e.g., a depth map) or with 3D information calculated based on information from another camera. In some embodiments, the first processing device can be configured to use the trained system on depth information (for example the 3D map data), in accordance with examples of the presently disclosed subject matter. In this implementation the system can be trained on depth information, such as 3D map data.

The second processing device may receive images from main camera and can be configured to perform vision processing to detect other vehicles, pedestrians, lane marks, traffic signs, traffic lights, road barriers, debris and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images or with the depth information obtained by stereo processing.

The third processing device may receive images from the wide FOV camera and process the images to detect vehicles, pedestrians, lane marks, traffic signs, traffic lights, and other road objects. The third processing device may execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

As will be appreciated by a person skilled in the art having the benefit of this disclosure, numerous variations and/or modifications can be made to the foregoing disclosed examples. For example, not all components are essential for the operation of system 100. Further, any component can be located in any appropriate part of system 100 and the components can be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 or alert a user of the vehicle in response to the analysis.

As discussed below in further detail and according to examples of the presently disclosed subject matter, system 100 may provide a variety of features related to autonomous driving, semi-autonomous driving, and/or driver assist technology. For example, system 100 can analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 can analyze the collected data to determine whether or not vehicle 200 should take a certain action, and then automatically take the determined action without human intervention or it can provide a warning, alert or instruction which can indicate to a driver that a certain action needs to be taken. Automatic actions can be carried out under human supervision and can be subject to human intervention and/or override. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 can analyze the collected data and issue warnings and/or alerts to vehicle occupants based on the analysis of the collected data.

Figure 4:
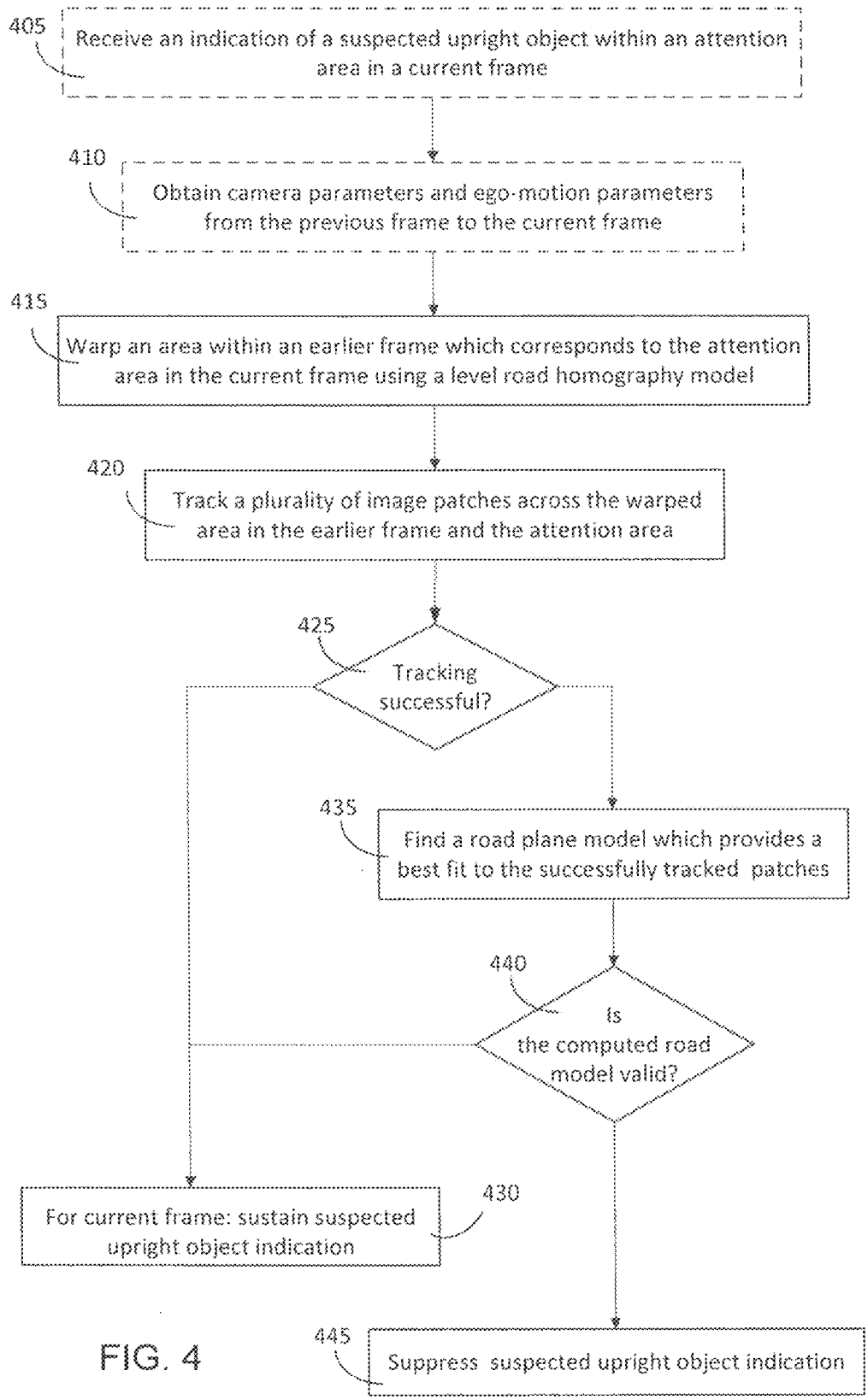
FIG. 4 is a flow chart illustration of an example of method of augmenting obstacle detection in an image of an environment of a vehicle consistent with the disclosed embodiments.

Reference is now made to FIG. 4, which is a flow chart illustration of a method of augmenting obstacle detection in an image of an environment of a vehicle, according to embodiments of the present disclosure. The method illustrated in FIG. 4 is described herein, by way of example, with reference to the system 100 shown in FIG. 1 and described above. While the method of augmenting obstacle detection can be implemented, according to embodiments of the present disclosure, using the system 100 shown in FIG. 1 and described above, the method is not limited in this respect and can be implemented on any suitable computer system.

At block 405, in indication of a suspected upright object may be received. The indication can point to an attention area within a current image frame where the suspected upright object is located. By way of example, the image frame can be generated from image data that was captured by the image acquisition unit 120. The indication can be provided as input to the processing unit 110. In another example, the image data corresponding to the current frame can be provided as input to the processing unit 110, which may execute an algorithm, and processing unit 110 may detect image data which is indicative of a suspected upright object. The algorithm may be an image processing algorithm that may process the current image frame and one or more earlier image frames, to detect image data which matches or which has one or more characteristics that may match a suspected upright object. For example one or more of: edge detection, image flow analysis, radar profiling, depth analysis (e.g., a 3D shape matching applied on a point cloud), etc. may be used to process the image data for detecting a suspected upright object. In addition, or as an alternative, a trained system may be used to detect the suspected upright object. A trained system may include any type of machine learning system that was trained over a large set of examples of a variety of scenes and/or conditions, usually under various imaging conditions, and which scenes include a variety of upright objects, which the trained system is expected to detect. The objects may be real or synthetically generated. The training set may also include images which do not have an upright object in them, to train the system in avoiding false positive detection. For example, a deep neural network that was trained over a large set of image data may be used.

The indication of a suspected upright object may be associated with an area within the image where the suspected upright object is located. For convenience, this area is sometimes referred to herein as the "attention area". In some examples of the present disclosure, the attention area may include a rectangular area (the "attention rect") which bounds the image data that corresponds to the suspected upright object. However, it would be appreciated that the attention area may be of any shape and form, as long as it contains primarily the image data that is associated with the suspected upright object.

The size of the attention area may depend on several factors, including, for example, the resolution of the sensor, the size of the object, and the distance to the object. The attention area may be, for example, in the order of tens over tens of pixels to hundreds over hundreds of pixels.

Still further by way of example, in addition to the current frame image data, data from other sensors and sources may be provided and used to detect a suspected upright object and for generating an indication in respect of such a suspected upright object. Geographical data, such as GPS readings, or an indication of a relative location, may be used to determine whether there is earlier information (e.g., reported by peer vehicles) about an upright object at the location where the image data indicates a potential suspected upright object indication. Prior information about such an object may increase confidence in such an indication, and vice-versa. In another example, RADAR, LIDAR, acoustic, and/or other sensor data may be used in combination with the image data to filter out potential suspected upright object indications that are not consistent with the data obtained from such other sources, or to increase confidence in the image data when it is consistent with the data from the other sensors. Object detection algorithms for various sensors, including RADAR, LIDAR, and acoustic sensors may be used in connection with the disclosed embodiments. Similarly, various system components, hardware, and software that may be used to execute such detection algorithms.

In addition to obtaining (e.g., receiving) the indication of a suspected upright object, camera parameters and ego-motion parameters from the earlier image frame to the current image frame may be obtained (block 410). The term camera is used in the method of FIG. 4, however, it will be appreciated that the camera parameters can be parameters of any image capture unit, such as the one shown in FIG. 1, for example, and may be associated with one or more cameras. Furthermore, the ego-motion parameters may relate to ego-motion of a host vehicle, that is, the vehicle in or on which the image capture unit is mounted. If necessary, host vehicle ego-motion data may be transformed into image capture unit ego-motion data. Furthermore, as will be described below, the ego-motion data may be used as part of method of augmenting obstacle detection, and may relate to the actual image frames that are used in the process. For example, if the frames that were captured by the image capture unit are indexed from 0 to n, n being the current image frame, the ego-motion data may relate to the motion of the image capture unit (for example) between frames (n−3) to n. In another example, the ego-motion data may relate to the motion of the image capture unit (for example) between frames (n−1) to n. In yet another example, the ego-motion data indicates the motion of the image capture unit across more than one pair of image frames, for example, it may indicate the motion of the image capture unit between each of image frames (n−3) to n, and (n−1) to n.

At block 415, an area in an earlier frame (say frame (n−5), or frame (n−1)) may be warped using a level road plane homography model. The area in the earlier image frame that is to be warped may be an area which corresponds to the attention area, or to the area in the current frame in respect of which the suspected upright indication was issued. According to embodiments of the present disclosure, in order to find which area in the earlier frame corresponds to the attention area, the camera parameters and the ego-motion parameters together with the level road homography model may be used. For example, the camera parameters and the ego-motion parameters together with the level road homography model may then be used to warp the selected area from the earlier frame.

The use of a level road model is one example of a possible road model which may be used in embodiments of the present disclosure. A level road model may assume a 0 degrees grade angle relative to a motion direction of the image capture unit. Various other road or plane models may be used in the warping of the earlier image frame. In some examples, a road plane model with a different grade angle and a different displacement distance (the distance where the road pitches up or down) may be used.

In some embodiments, warping just the area from the earlier frame which corresponds to the attention area in the current frame may be computationally more efficient (than warping the entire image or a larger portion of the image), but other embodiments of the present disclosure are not necessarily limited in this respect. For example, a certain margin may be added to the area in the previous frame which was found to be correlated with the attention area in the current frame, and the warping operation(s) may be applied to the extended area (with the added margins) in the previous frame.

Next, the attention area in the current frame and the warped area in the previous frame may be segmented into corresponding patches, and a plurality of image patches may be tracked across the warped area in the earlier image frame and the attention area (block 420).

The patches may be of different sizes (the patches themselves are typically equal in size to one another). For example, each one of the patches can be 13 pixels over 13 pixels, but other sizes can be used. In embodiments of the presently disclosed subject matter, the size of the patches may be selected to provide good results for tracking of road surfaces. It would be appreciated that road surfaces usually do not have strong textures, and so relatively large patches may be used. The size of the patch may be fixed or it can vary depending on factors such as type of road, lighting, glaring and other imaging conditions, etc.

The number of patches that are used may depend on several factors (some of which may be related), including the scale or a distance of the suspected upright object (relative to the host vehicle or relative to the imaging unit), the size of the object, the size of the attention area, the resolution of the imaging unit, etc. Using current equipment, a typical number of patches used for a given attention area is between 10 and 75.

One or more tracking algorithms may be used in embodiments of the presently disclosed subject matter, to track a plurality of patches across the current image frame and one or more earlier image frames. In one example, a forward-backward tracking algorithm may be used in the tracking operation. In this example, a patch from the warped earlier image frame is searched for in the current image frame within a search area, and then the provisionally matching patch in the current image frame may be search, within a search area, in the warped earlier image frame. If the distance between the two matching patches from the current image frame and the warped earlier image frame is less than a threshold, tracking may be considered to be successful for this patch. Otherwise the tracking may be considered to have failed for that patch.

In one example, tracking may be performed by an exhaustive search for the best sum of squared absolute distances (SAD) in a rectangular search region that is, for example, 20 pixels over 20 pixels. It would be appreciated that other methods can be used, include for example, sum of squared differences (SSD).

Forward (from the current frame to the earlier frame) backward (from the earlier frame back to the current frame) tracking may be used. Again, other tracking method may be used and are consistent with the disclosed embodiments.

This means that, in this example, the patch from the warped image is searched within an area that extends 10 pixels in each direction around the corresponding area within the attention area, according to the projection parameters (the camera parameters, ego motion parameters, and the level road model). Further in accordance with the present example of the tracking operation, in the backward tracking, the patch form the attention area (in the current frame) found in the forward tracking (say 13×13 pixels) may be searched for within an area that extends 10 pixels in each direction around the position of the patch from the earlier image that was used in the forward tracking. It would be appreciated, that different patch sizes may be used and other search area sizes may be used as part of the tracking operation.

The threshold that is used to evaluate successful tracking may be, for example, one pixel, so if the tracking matches patches from the current and warped earlier frame than are at most 1 pixel from one another, than a successful tracking indication may be generated for that patch pair. If the distance is greater than 1 pixel from one another, than no tracking indication may be generated for that patch pair, or a failed tracking indication may be provided. It would be appreciated that various thresholds may be used and various method can be used to measure the tracking between patch pairs.

At block 425, it may be determined if tracking succeeded. A tracking success criterion may be used to determine if tracking succeeded. For example, as part of determining if tracking was successful, it may be determined how many patches were tracked successfully. If the number of patches that were successfully tracked is greater than a certain threshold, then that tracking may be considered to have been successful. If the number of patches that were successfully tracked is less (or not greater) than a certain threshold, then that tracking may be considered to have failed. In some embodiments, instead of a number of patches a certain ratio between successfully tracked patches and unsuccessfully tracked or the total number of patches may be used. If the tracking is determined to be unsuccessful, the process may end with no effect over the indication of a suspected upright object or over a process that relies on or otherwise uses such indications to control at least one aspect of an operation of the vehicle (block 430), and for the current frame, a suspected upright indication may be sustained. In effect, the method of FIG. 4, may not interfere with the upright object detection process (beyond, for example, the processing and delays involved in the implementation of the method).

It should be noted, that in embodiments of the present disclosure, as will be further discussed below, a road plane model may be used as a tool to increase the confidence and reliability (and possibly also dependability) of an indication of a suspected upright object detection. A steep road (or a road which appears steep due to the host vehicle's pitch angle combined with the grade of the road plane) may, when using one or more image processing algorithms, produce image data that behaves somewhat similarly to an upright object.

Figure 5:
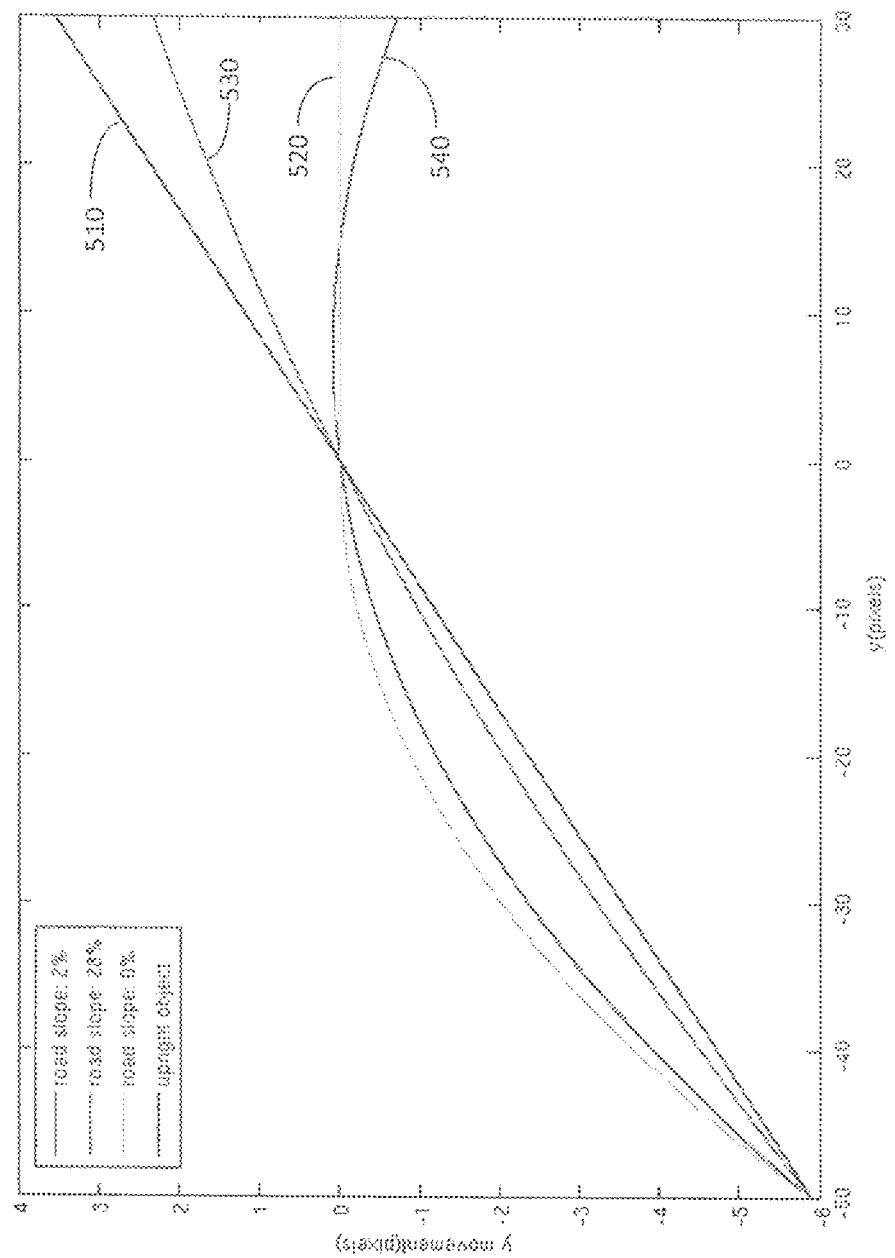
FIG. 5 illustrates an example of an image follow motion diagram of several road planes having different grades and including an upright object consistent with the disclosed embodiments.

FIG. 5 illustrates an example of an image follow motion diagram of several road planes having different grades, and an upright object, according to the disclosed embodiments.

As can be seen in FIG. 5, the image flow behavior of an upright object, represented by line 510, is quite different from the image flow behavior of a 0 degrees road plane (or Δgrade=0) (represented by line 520). Distinguishing a 2 degrees grade road plane (or Δgrade=2) (represented by line 540) from an upright object using image flow remains a relatively straightforward task, as can be seen in FIG. 5. However, as can also be seen in FIG. 5, distinguishing a 28 degrees grade road plane (or Δgrade=28) (represented by line 530) from an upright object using image flow may become a challenging task. When considering that actual image data is affected by noise, calibration errors, ambient conditions, and distortions and artifacts etc., the risk that image data that was determined to be an upright object is in fact a high grade road plane may be even greater.

The use of the road plane model, and the various operations and configurations that are part of the application of the road plane model, including the segmentation of the areas in the image frames into patches, may not have, as a primary goal, the intention to detect a road plane, but rather, by testing (mathematically) an alternative hypothesis to the upright object detection, and suppressing such indications in case the fit to the road plane model may meet certain criteria, the rate of false positive detections based on image data of upright objects which may potentially be an obstacle in the path of the host vehicle may be reduced. In other words, the value of testing the image data for a possible correlation with a road plane model may be its ability to reduce, under certain circumstances, a rate of false positive upright object detection, and may not necessarily used to provide actionable, stand-alone, data which is useful for controlling the vehicle. From another perspective, the confidence with respect to suspected upright objects detection may be increased by testing for the alternative road plane hypothesis. In some embodiments, it is likely that many frames can be used in the detection process of an upright object, and so even if the indication of a suspected object may be suppressed for a given frame. If there is an actual upright object along the path of the vehicle, it is likely that it would be successfully detected in enough of those frames to trigger a reaction. In this context, it should be understood that the patch segmentation operation may be configured to enable tracking of road patches across the image frames, and in particular to track patches which one would expect should be tracked successfully when the patches are of a road plane, under common imaging and ambient conditions.

Certain intermediary steps of the method may also be implemented towards this goal. For example, using a level road plane homography as part of the warping operation when the attention area is associated with an upright object, may yield more unsuccessful tracked patches compared to an attention are that is associated with a high grade road plane. In both cases there may be a distortion, but in case the attention area is associated with a road plane (even if it is a relatively steep grade road plane), the distortion will be less severe, (compared to an upright object) and often, enough patches may be tracked successfully, whereas for an upright object, warping using a level road plane may cause a distortion that will prevent more of the patches to fail the tracking.

Returning to FIG. 4, in some embodiments, if at block 425 it was determined that tracking was successful, e.g., that enough patches met the tracking criterion, the method may proceed to block 435, where a search for a road plane model which provides a best fit to the successfully tracked patch pairs is carried out. For example, a search may be initiated over a set of parameters of the road plane model to minimize an error between pairs of points from the attention area in the current image frame and points in the corresponding area in the earlier image frame.

In some embodiments, the road plane model may use patches which tracked successfully at block 420. By way of example, the center point of each such successfully tracked patch may be used. This point may be the center pixel of the patch. Next, the corresponding center point of the corresponding patch area from the earlier frame may be obtained. This area may be warped according to the warp parameters mentioned above (the camera parameters, the ego-motion parameters and the level plane road model), or the already warped version of the patch from the earlier frame may be used. This pair of points may be used with the road plane model. It would be appreciated that other points may also be used with the road plane model such as, for example, the point at the top left corner, the bottom right corner, etc. In addition or as an alternative, some derivative of one or more points may be used.

An example of a road plane model and its parameters are described in greater detail below.

As shown in FIG. 4, following to search for the best fit road plane model, the road plane model that was determined to provide the best fit may be subjected to a validation test (block 440). More details about the validation test and aspects of the road plane model and/or of the fit to the images frame(s) are described below. If it is determined at block 440 that the road plane model failed to successfully pass the validation tests, than the process may proceed to block 430, and the process may end with no effect over the indication of a suspected upright object or over a process which relies on or otherwise uses such indications to control at least one aspect of an operation of the vehicle. If however, it is determined that the best fit road plane model is valid, than the suspected upright object indication may be suppressed (block 445) and/or a reaction that is responsive to an upright object indication may be suspected or otherwise disabled (this reaction can be a result of the suppression of the upright object indication).

According to examples of the presently disclosed subject matter, the road plane model may include one or more of the following parameters: FOE (focal of expansion), road plane grade, Δgrade, Δyaw, and road plane displacement. The road plane model may also include a parameter for the image capture unit's focal length.

In some embodiments, some of these parameters may be received as input. For example, the Δgrade and Δyaw, which relate to a difference in grade angle and yaw angle in between the current image frame and the earlier image frame, may be obtained from one or more sensors onboard the host vehicle, for example.

Displacement of the road plane may be represented by a point that is defined as the point of intersection between the road plane and a normal to the imaging unit moving direction vector, at the focal point (through which the moving direction vector passes).

An example of one possible road plane model is presented below.

It would be appreciated that the above road plane model parameterization is provided by way of example, and that corresponding, but different, parameterization may be devised by those of ordinary skill in the art. For example, the road plane grade and the road plane displacement may be represented by the normal and distance (displacement) to the road plane from the focal point of the image capture unit or physical equivalent. In addition, in certain conditions some of the parameters mentioned above, may be omitted or neglected, for example, when there is prior knowledge that a certain segment of road (in respect of which the suspected upright object indication is received) is straight (Δyaw is zero or close to zero), Δyaw can be omitted.

Figure 6:
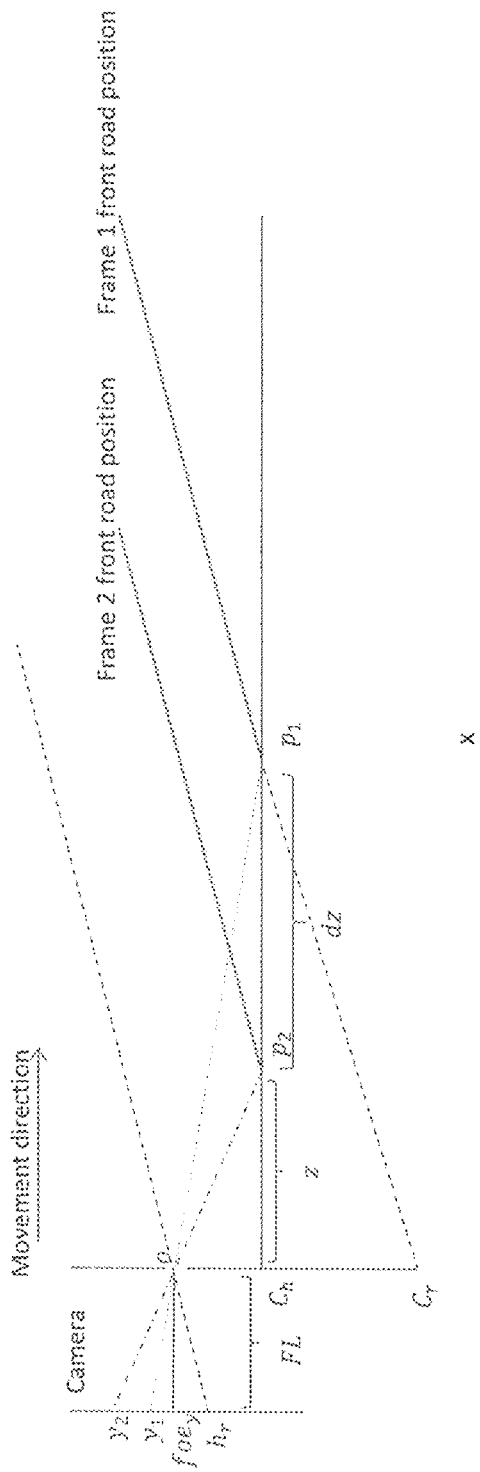
FIG. 6 is an example of a geometrical schematic of a road plane model consistent with the disclosed embodiments.

FIG. 6 shows a geometrical schematic of a road plane model, according to the disclosed embodiments. In FIG. 6, the notations are used with the following meaning:

$p_1$ is a point in frame 1 (captured at time $t_1$) which corresponds to a certain point on the road plane; $p_2$ is a point in frame 2 (captured at time $t_2$) which corresponds to the same point on the road plane as point on the road plane as that to which $p_1$ corresponds; dz denotes image capture unit movement in meters towards an inclining road plane in the time duration between $t_1$ and $t_2$; $h_r$ represents the grade of the road as translated a pixel location on the camera ($h_r$=fl*tan$^{-1}(\alpha)$), where fl is the focal length of the image capture unit and a is the angle of the road relative to direction of motion vector of the image capture unit); $C_r$ is a point of intersection between the road plane and a normal to the image capture unit moving direction vector, at the focal point (through which the moving direction vector passes).

Using similarity of triangles $C_r op_1$ and $h_r y_1 o$ one can get $$\frac{z+dz}{C_r} = \frac{FL}{h_r - y_1} \Rightarrow z = \frac{C_r FL - dz(h_r - y_1)}{h_r - y_1}. \quad \text{(Formula 1)}$$

Using similarity of triangles $C_h op_2$ and foe$_y y_2 o$ one can get $$\frac{z}{C_h - o} = \frac{FL}{foe_y - y_2}. \quad \text{(Formula 2)}$$

Using similarity of triangles $C_h op_1$ and foe$_y y_1 o$ one can get $$\frac{z+dz}{C_h - o} = \frac{FL}{foe_y - y_1}. \quad \text{(Formula 3)}$$

Using Formulae 2 and 3 we get $$\frac{z+dz}{z} = \frac{foe_y - y_2}{foe_y - y_1} \Rightarrow \frac{dz}{z} = \frac{foe_y - y_2}{foe_y - y_1} - 1 \quad \text{(Formula 4)}$$

Insert z from (Formula 1) and one gets:

$$y_2 = y_1 + (y_1 - foe_y)\frac{dz(h_r - y_1)}{C_r FL - dz(h_r - y_1)} \Rightarrow y_2 = \quad \text{(Formula 5)}$$
$$(y_1 - foe_y)\left[1 + \frac{dz(h_r - y_1)}{C_r FL - dz(h_r - y_1)}\right] + foe_y.$$

Or $$y_2 = (y_1 - foe_y)\left[\frac{1}{1 - \frac{dz(h_r - y_1)}{C_r * FL}}\right] + foe_y. \quad \text{(Fromula 6)}$$

Adding pitch one gets $$y_2 = (y_1 - foe_y) \left[ \frac{1}{1 - \frac{dz(h_r - y_1)}{C_r * FL}} \right] + foe_y + \text{pitch.} \quad \text{(Fromula 7)}$$

Given that $$s(y_1) = \frac{1}{1 - \frac{dz(h_r - y_1)}{C_r * FL}}$$

We get: $y_2 = s(y_1)*(foe_y - y_1) + foe_y + \text{pitch}$ (Formula 8).

And using similar analysis one gets: $x_2 = s(y_1)*(foe_x - x_1) + foe_x + \text{yaw}$ (Formula 9).

Based on points movement (several $p_1$, $p_2$ pairs) the entire road plane model may be estimated, including $C_r$ and $h_r$. A threshold may be applied to $h_r$, and this threshold together with the computed $h_r$ can be used to determine whether the image data is consistent with a road plane or an upright object.

It would be noted that the equation is not linear. One example of a method that can be used to solve the equation, and which may be implemented in some disclosed embodiments, is a non-linear iterative re-weighted least square (IRLS) method one the movement error. However, other similar method can also be used.

Figure 7:
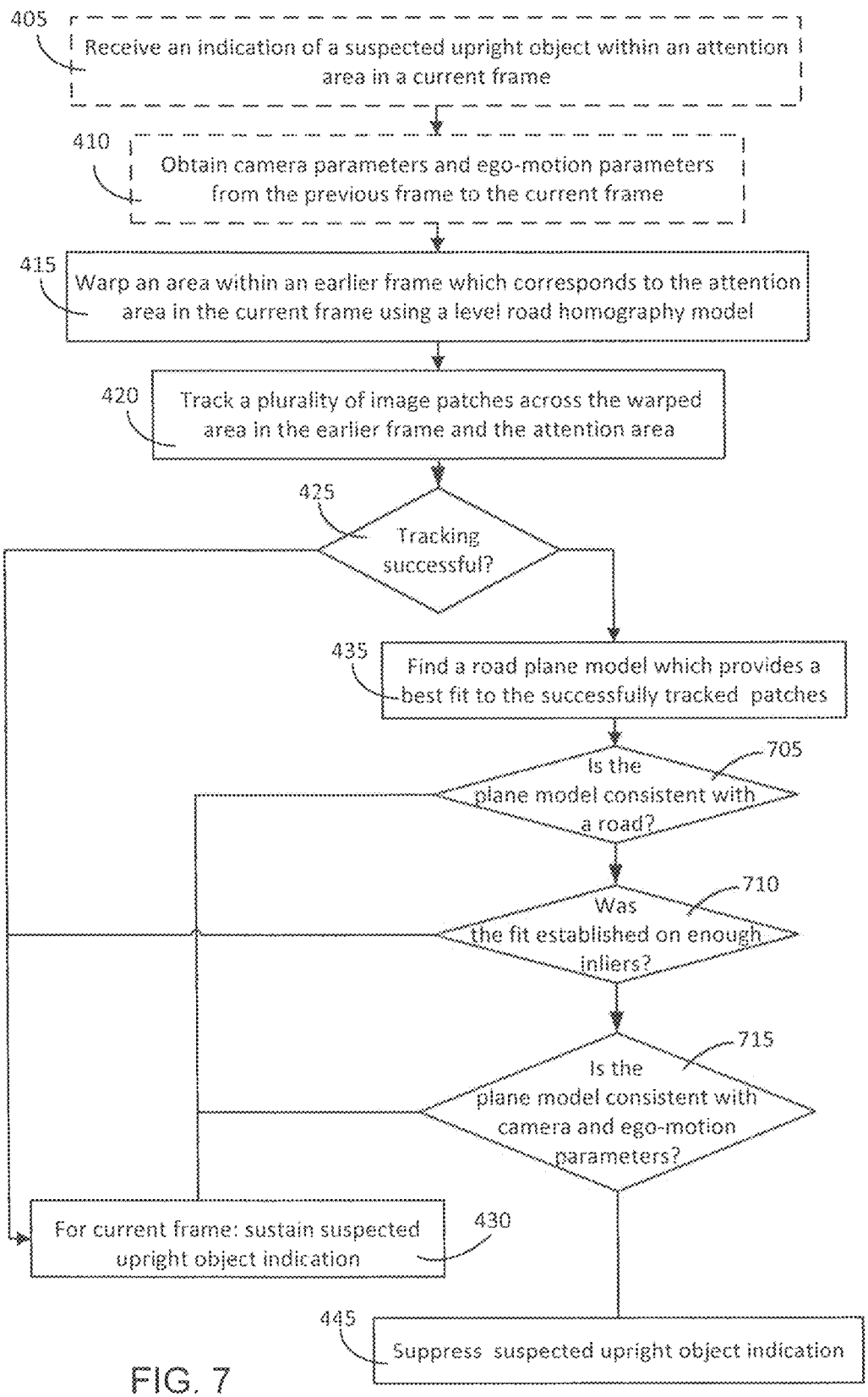
FIG. 7 is a flowchart illustration of an example of a method of augmenting obstacle detection from an image of an environment of a vehicle, including road plane model validation operations, according to the disclosed embodiments.
Figure 8A:
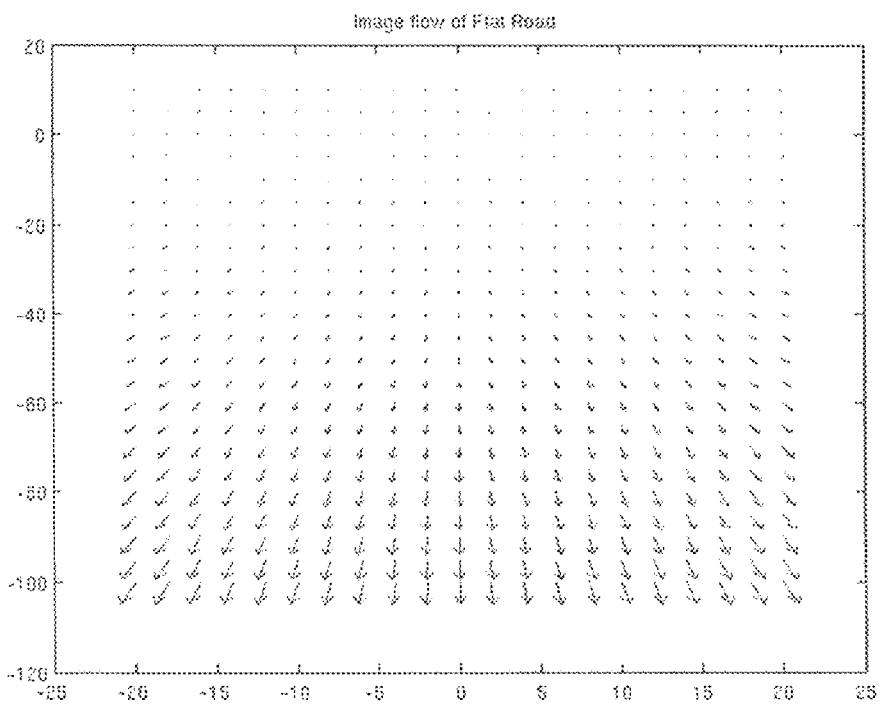
FIGS. 8A-SD show examples of graphical illustrations of an image of image flow analysis across two image frames, for each of: a flat\level (0 degrees grade) road plane (FIG. 8A), and upright object (FIG. 8B), a road plane with a 4 degrees grade/incline (FIG. 8C) and a road plane with a 12 degrees grade/incline (FIG. 8D), according to the disclosed embodiments.
Figure 8B:
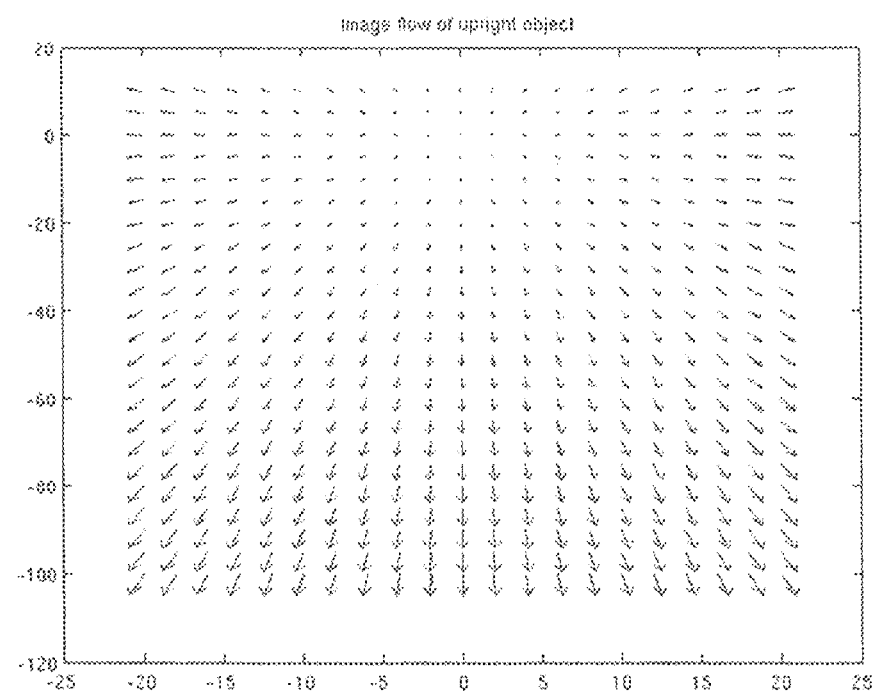
Figure 8C:
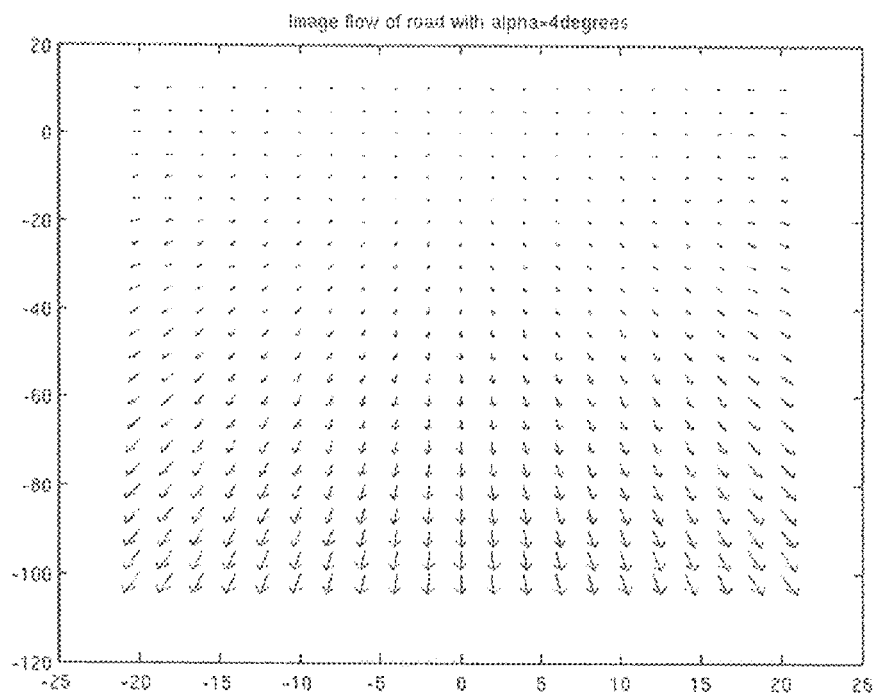
Figure 8D:
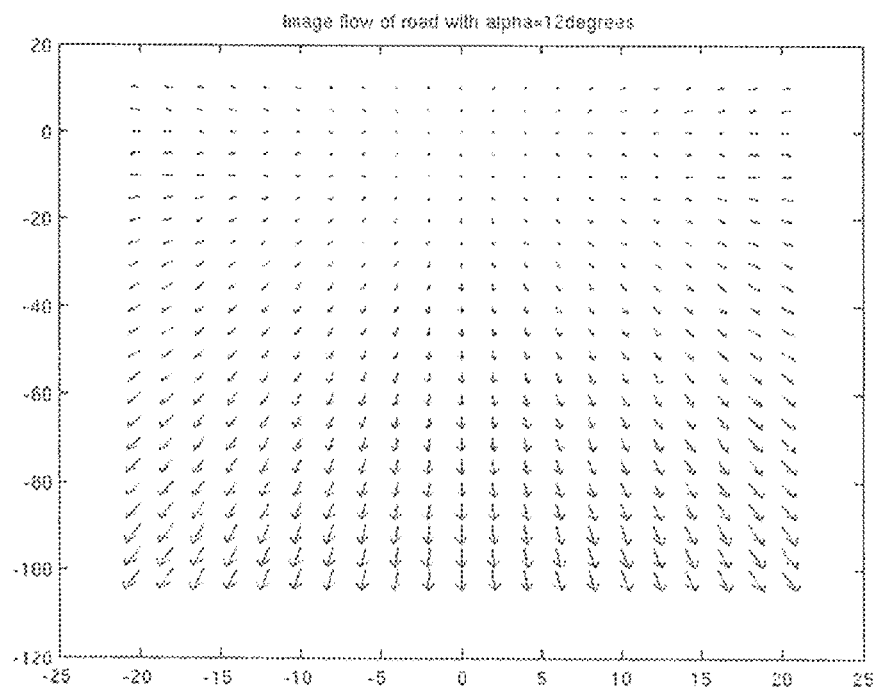

Referring back to block 440 of FIG. 4, the computed road model may be validated. Additional reference is now made to FIG. 7, which is a flowchart illustration of a method of augmenting obstacle detection from an image of an environment of a vehicle, including road plane model validation operations, according to embodiments of the present disclosure. In FIG. 7, and according to embodiments of the present disclosure, block 440 of FIG. 4 may be substituted with road plane validation operations 705-715. It would be appreciated that validation of the road plane model may include any one of the operations illustrated by blocks 705-715, and in addition or as an alternative other validation operations, and any order among the operations that is operable may be used. The tests may be applied in series or in parallel. The process may require that the best fit road model passes all the tests, some of which (e.g., a majority), at least some of which (e.g., where some provide a stronger/weaker indication of validity), or meet some other criterion, including for example, score a score that is above a threshold, and which score is computed from results of each one of a plurality of validation tests.

In block 705, it may be determined whether the road plane model is consistent with a road. For example, the model that is found in block 435 as the best fit to the successfully tracked object may be examined to determine whether it is at all consistent with would a model of a road would look like and/or whether the best fit model is more consistent with an upright object than a road plane. Thus for example, if the best fit road model indicates a road plane grade that is above a threshold maximum road plane grade, it may be concluded that the best fit road plane model is not associated with a road plane, and the process may proceed to block 430, and cause the suspected upright object detection to be sustained (including by default). It would be appreciated that the threshold may be predefined, or it can be set based on some input. For example, the location of the imaging unit may be used to retrieve a local maximum road plane grade parameter that may be used to set the threshold. In another example, the threshold may be set according to information derived from another sensor, including from another camera onboard the vehicle, from a radar sensor, from a lidar system, from an acoustic sensor, from information communicated to the vehicle, e.g., from a remote server, or from a nearby vehicle, etc.

At block 705, in some embodiments, another test may be used to apply the image points to an upright object model and determine which model, the road plane model and the upright object model, results in a better fit. If the upright object model results in a better score (e.g., fit), than it may be determined at block 705 that the plane model is not consistent with a road plane, and the process may proceed to block 430. If however, the road plane model is the higher scoring model, than the process may proceed to further validations or to block 445 at which suppression of the upright object indication may occur.

Resuming the description of FIG. 7, another validation test that may be implemented as part of the method of augmenting obstacle detection from an image of an environment of a vehicle is illustrated in block 710, which relates to determining if the best fit was established on enough inliers. For example, the error of each point that was used at block 435 to find the best fit road model relative to the best fit road plane model may be computed, and a threshold may be used to classify the points as inliers and outliers and some criterion may be used to determine whether the number of outliers or some function related to the distribution or distance of the outliers or inliers or both relative to the road plane model indicate that the best fit road model is valid or not. Again, if the best fit road model passes the validation test, the process may proceed to block 445, or to the next test, and if it fails, the process may proceed to block 430.

At block 715, the next (but not necessarily so and not limited to the order shown in FIG. 7) validation test may include determining whether the best first road plane model is consistent with camera and ego-motion parameters. As indicated above, the model may use, as variables, one or more camera parameters and ego-motion parameters. The resulting camera parameters and ego-motion parameters from the best fit road plane model may be compared against corresponding measured parameters, which may be obtained for example, from the image capture unit, or from a memory that store information about the image capture unit, and from geolocation and inertial measurement sensors onboard the vehicle. Ego-motion may also be estimated from images or from data obtained from other sensors. Depending on results of the validation, the process may proceed to blocks 430 or 445 or to the next validation test (if such a test is applicable).

FIGS. 8A-8D show graphical illustrations of an image of image flow analysis across two image frames, for each of: a flat\level (0 degrees grade) road plane (FIG. 8A), and upright object (FIG. 8B), a road plane with a 4 degrees grade/incline (FIG. 8C) and a road plane with a 12 degrees grade/incline (FIG. 8D), according to embodiments of the present disclosure. As can be seen in FIGS. 8A-8D, the image flow of an upright object and a 0 degrees road plane is clearly noticeable. At 4 degrees incline FIG. 8C the image flow is quite similar to the image flow of the level road plane. However, even at just 12 degrees incline (or rather when Δgrade is 12 degrees), the image flow for such a segment of a road surface would not be easily discernable from that of an upright object, in particular when considering noise, and other artifacts.

Figure 9:
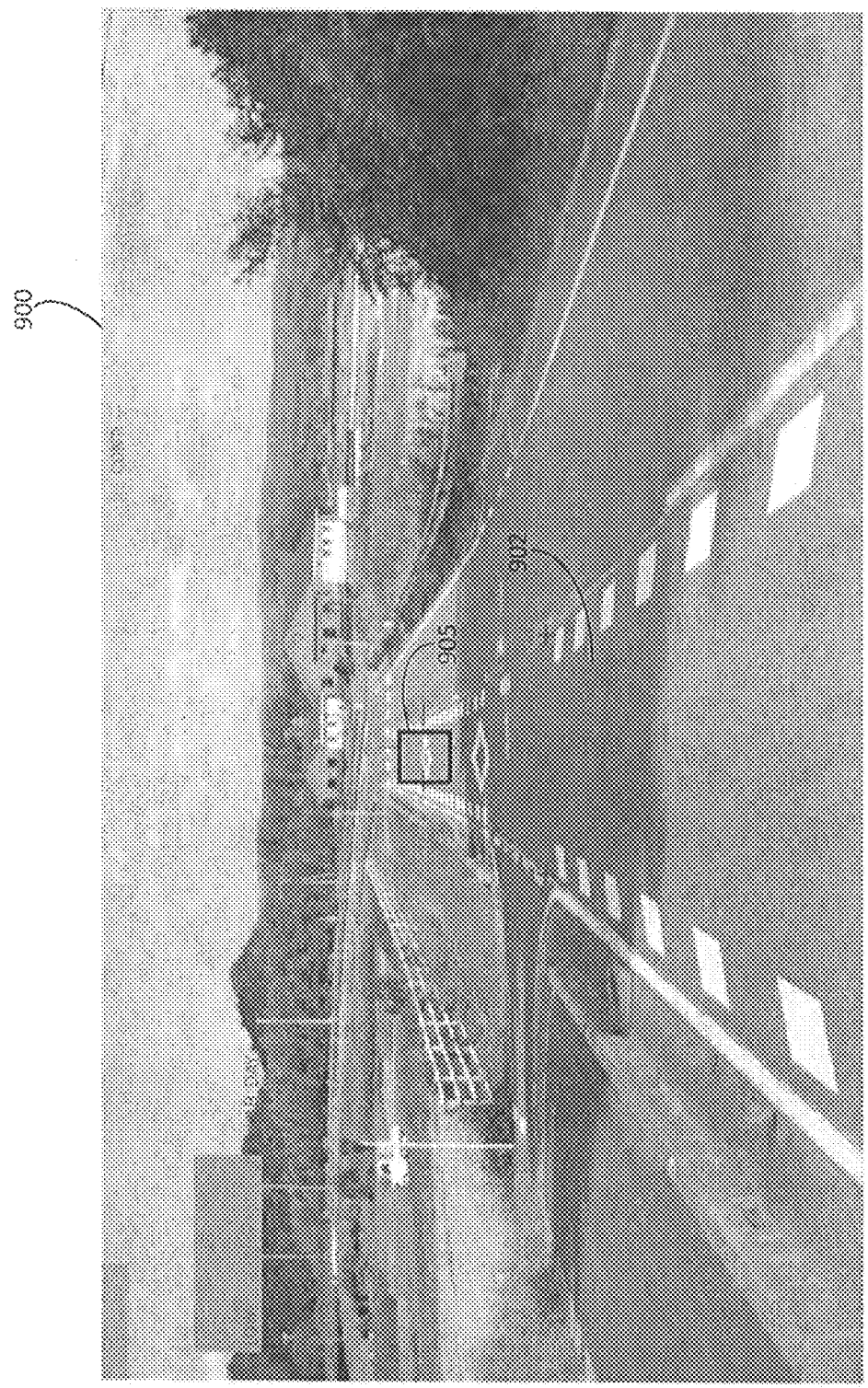
FIG. 9 an example of image data that may lead to a false suspected upright object indication, consistent with some of the disclosed embodiments.

Reference is now made to FIG. 9, which shows an example of a false suspected upright object indication, in accordance with the disclosed embodiments. As can be seen in FIG. 9, while driving a section of road 902, a vehicle (not shown) having an ADAS system (not shown) including an image capture unit (not shown) mounted thereon, may capture an image frame 900. The image frame 900, which represents an area or environment ahead of the vehicle, may be processed, for example using an image flow algorithm, and a suspected upright object 905 was detected. As can be seen in the image 900, the suspected upright object 905 is not actually an upright object, but rather a marking (i.e., a rhombus marking) on the surface of the road 902. The detection in this case, was triggered as a result of the section of the road 902 having a Δgrade that is relatively high, and as a result, a section of the road 'behaved' similarly to an upright object. The method of augmenting obstacle detection in accordance with the disclosed embodiments would have assisted in suppressing a possible false positive obstacle alert in this (and in other similar scenarios.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for augmenting detection of objects in an environment of a vehicle, the system comprising:
at least one processing device programmed to:
receive, from an image capture device, a first image frame, the first image frame including an attention area associated with a suspected upright object indication;
warp, using a level road plane model, an area in a second earlier image frame that corresponds to the attention area;
track a plurality of image patches across the warped area and the attention area;
compute a road plane model fit to the tracked image patches;
determine whether to suppress the upright object indication based on the tracked image patches being more consistent with a road plane model than with an upright object model; and
suppress the upright object indication when the road plane model is consistent with camera and ego-motion parameters of the imaging capture device that was used to capture the first and second image frames.

2. The system of claim 1, wherein the at least one processing device is further programmed to suppress the upright object indication when a relationship between the tracked image patches and the road plane model provides a number of inliers that is above a threshold.

3. The system of claim 1, wherein the at least one processing device is further configured to suppress the upright object indication when a grade of the road plane model is consistent with a predetermined road grade.

4. The system of claim 3, wherein the predetermined road grade is associated with a location of the vehicle.

5. The system of claim 1, wherein the at least one processing device is further programmed to suppress the upright object indication when a number of the tracked image patches is above a threshold.

6. The system of claim 1, wherein the at least one processing device is further programmed to allow the suspected obstacle indication to proceed when a number of the tracked image patches is less than a threshold.

7. The system of claim 1, wherein the at least one processing device is further programmed to allow the upright object indication to proceed when a relationship between the tracked image patches and the road plane model provides a number of inliers that is less than a threshold.

8. The system of claim 1, wherein the at least one processing device is further programmed to allow the upright object indication to proceed when the road plane model is not consistent with camera and ego-motion parameters of the imaging capture device that was used to capture the first and second image frames.

9. The system of claim 8, wherein the predetermined road grade is associated with a location of the vehicle.

10. The system of claim 1, wherein the at least one processing device is further programmed to allow the upright object indication to proceed when a grade of the road plane model is not consistent with a predetermined road grade.

11. The system of claim 1, wherein the road plane model includes a parameter for a road plane grade or a road plane displacement.

12. The system of claim 1, wherein the road plane model includes a parameter for at least one of: a focal of expansion, a focal length, a road plane grade, a change in a road plane grade, a yaw value, or a road plane displacement.

13. A method for augmenting detection of objects in an environment of a vehicle, the method comprising:
receiving, from an image capture device, a first image frame, the first image frame including an attention area associated with a suspected upright object indication;
warping, using a level road plane model, an area in a second earlier image frame that corresponds to the attention area;

tracking a plurality of image patches across the warped area and the attention area;

computing a road plane model fit to the tracked image patches;

determining whether to suppress the upright object indication based on the tracked image patches being more consistent with a road plane model than with an upright object model; and suppressing the upright object indication when the road plane model is consistent with camera and ego-motion parameters of the imaging capture device that was used to capture the first and second image frames.

14. The method of claim 13, further comprising suppressing the upright object indication when a relationship between the tracked image patches and the road plane model provides a number of inliers that is above a threshold.

15. The method of claim 13, further comprising suppressing the upright object indication when a grade of the road plane model is consistent with a predetermined road grade.

16. The method of claim 15, wherein the predetermined road grade is associated with a location of the vehicle.

17. The method of claim 13, further comprising suppressing the upright object indication when a number of the tracked image patches is above a threshold.

18. The method of claim 13, further comprising allowing the suspected obstacle indication to proceed when a number of the tracked image patches is less than a threshold.

19. The method of claim 13, further comprising allowing the upright object indication to proceed when a relationship between the tracked image patches and the road plane model provides a number of inliers that is less than a threshold.

20. The method of claim 13, further comprising allowing the upright object indication to proceed when the road plane model is not consistent with camera and ego-motion parameters of the imaging capture device that was used to capture the first and second image frames.

21. The method of claim 13, further comprising allowing the upright object indication to proceed when a grade of the road plane model is not consistent with a predetermined road grade.

22. The method of claim 21, wherein the predetermined road grade is associated with a location of the vehicle.

23. The method of claim 13, wherein the road plane model includes a parameter for a road plane grade or a road plane displacement.

24. The method of claim 13, wherein the road plane model includes a parameter for at least one of: a focal of expansion, a focal length, a road plane grade, a change in a road plane grade, a yaw value, or a road plane displacement.

25. A non-transitory computer-readable medium storing program instructions for carrying out a method, the method comprising:

receiving, from an image capture device, a first image frame, the first image frame including an attention area associated with a suspected upright object indication;

warping, using a level road plane model, an area in a second earlier image frame that corresponds to the attention area;

tracking a plurality of image patches across the warped area and the attention area;

computing a road plane model fit to the tracked image patches;

determining whether to suppress the upright object indication based on the tracked image patches being more consistent with a road plane model than with an upright object model; and suppressing the upright object indication when the road plane model is consistent with camera and ego-motion parameters of the imaging capture device that was used to capture the first and second image frames.

* * * * *